United States Patent [19]
Paule et al.

[11] 3,818,299
[45] June 18, 1974

[54] MOTOR ARRANGEMENT
[75] Inventors: Kurt Paule, Stuttgart-Oberturkheim;
Fritz Schadlich, Stetten, both of Germany
[73] Assignee: Robert Bosch GmbH, Stuttgart, Germany
[22] Filed: Feb. 23, 1973
[21] Appl. No.: 335,124

Related U.S. Application Data
[60] Division of Ser. No. 132,896, April 9, 1971, abandoned, which is a continuation-in-part of Ser. No. 819,704, April 28, 1969.

[30] Foreign Application Priority Data
Apr. 27, 1968  Germany............................ 1763278

[52] U.S. Cl.................................. 318/353, 318/424
[51] Int. Cl.......................... H02p 1/12, H02p 5/16
[58] Field of Search........... 318/252, 351, 353, 356, 318/387, 400, 424, 426, 338, 325, 405, 247

[56] References Cited
UNITED STATES PATENTS
2,417,710  3/1947  Smith................................. 318/400
2,602,888  7/1952  Audier............................... 318/400
3,524,120  8/1970  Brown................................ 318/356

FOREIGN PATENTS OR APPLICATIONS
1,563,639  7/1966  Germany............................ 318/252
904,560    5/1945  Germany............................ 318/351

Primary Examiner—Robert K. Schaefer
Assistant Examiner—Thomas Langer
Attorney, Agent, or Firm—Michael S. Striker

[57] ABSTRACT

A motor arrangement, particularly for use in power tools includes a D.C. motor having an armature winding having two terminals. A rectifier stage converts A.C. voltage into D.C. voltage and has two output terminals. A shunt-field winding has two terminals and is connected across the rectifier output terminals and has one terminal connected to one terminal of the armature winding. A series-field winding has one terminal connected to the other terminal of the armature winding. A diode is connected between the other terminal of the series-field winding and the other terminal of the shunt-field winding with its anode and cathode so connected as to carry in forward diode direction current flowing through said armature winding. A centrifugal switch or time-delay unit is operative for short-circuiting at least part of the series-field winding after the start-up operation of the motor has proceeded to a predetermined extent. The provision of the diode effects a noticeable improvement in the efficiency of the motor.

8 Claims, 6 Drawing Figures

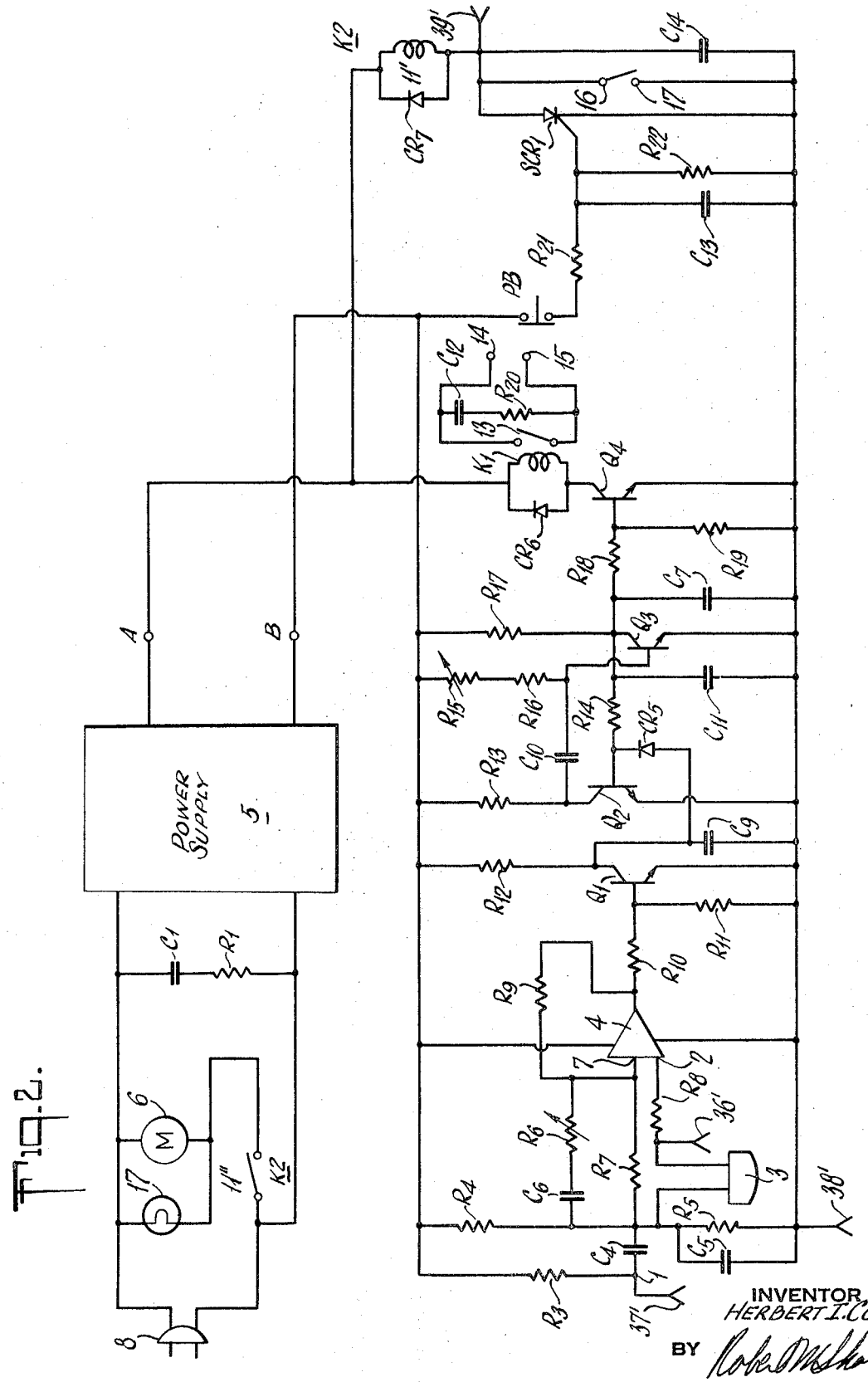

MOTOR ARRANGEMENT

CROSS-REFERENCE TO RELATED APPLICATIONS

The present application is a division of copending U.S. Pat. application Ser. No. 132,896 filed on Apr. 9, 1971 and now abandoned. U.S. Pat. application Ser. No. 132,896, was a continuation-in-part of earlier U.S. Pat. application Ser. No. 819,704 filed on Apr. 28, 1969.

BACKGROUND OF THE INVENTION

The present invention relates to D.C. motors in general and more particularly to D.C. motor arrangements used in electric power tools, particularly of the hand-held variety.

It is already known in general to provide a D.C. motor with both a shunt-field winding and a series-field winding, so as to constitute a so-called compound motor. In any such motor the energizing current furnished to the motor serves not only in the desired manner to produce torque, but also undesirably results in various magnetic-field phenomena leading to the loss of energy and to considerably less than 100 percent efficiency of the motor. These losses are of many different types and a large variety of different expedients is known in the prior art for reducing various ones of these losses. Needless to say, however, the operation of D.C. motors, and particularly compound D.C. motors of the prior-art, is far from loss-free, indicating that considerable room for the further elimination of energy losses exists.

The present invention relates in particular to D.C. motors employed in electric power tools, particularly of the hand-held variety, where the motor is often located in a very confined space, such as a tool housing, and where accordingly the possibility of cooling the motor by ventilating expedients may be more or less limited. It is understandable that energy losses of the type which result in heating up of the motor are particularly undesirable in a confined space of that type.

SUMMARY OF THE INVENTION

It is accordingly the general object of the present invention to provide a D.C. motor arrangement exhibiting at least some reduction in energy losses, compared to similar motors, particularly in so far as the energy losses are of the type tending to undesirably heat up the motor.

This object, and others which will become more apparent hereafter, can be met according to the invention by providing a motor arrangement, particularly adapted for use in electric power tools, especially of the hand-held variety, which includes a D.C. motor comprising an armature winding having two terminals. A rectifier stage converts A.C. voltage into D.C. voltage and has two output terminals. A shunt-field winding has two terminals and is connected across the output terminals, having one terminal connected to one terminal of the armature winding. A series-field winding has one terminal connected to the other terminal of the armature winding. A diode is connected between the other terminal of the series-field winding and the other terminal of the shunt-field winding with its anode and cathode so connected as to carry in forward diode direction current flowing through the armature winding. A centrifugal switch or other equivalent unit is operative for short-circuiting at least part of the series-field winding after the start-up operation of the motor has proceeded to a predetermined extent. Instead of a centrifugal switch an electronic time-delay stage, for example, can also be employed for effecting short-circuiting of the series winding at an appropriate time.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
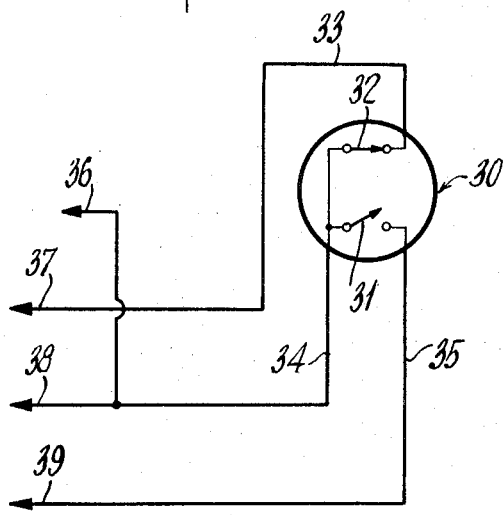
FIG. 1 illustrates a first embodiment according to the invention.

The motor arrangement shown in FIG. 1 includes a motor having an armature winding 18. The motor has a series-field winding shunted by a capacitor 27b and a shunt-field winding shunted by a further capacitor 27a. The armature winding, likewise, is shunted by an additional capacitor 27c. A diode, which is effective for reducing energy losses, has a cathode connected to one terminal of the shunt-field winding and has an anode connected to one terminal of the series-field winding.

The provision of the motor shown in FIG. 1 with both a series-field winding and a shunt-field winding combines the desirable start-up and overload characteristics of a series-wound motor with the largely load-independent speed characteristics of a shunt-wound motor. In some circumstances, it is advantageous to provide the compound motor with a time delay switch, which short-circuits the series-field winding after the motor has started up. In FIG. 1, the delayed shorting out of the series-field winding is accomplished by a pair of contacts designated by reference numeral 23 operatively associated with the switch of the power tool. When the motor is turned on, initially both the series-field winding and the shunt-field winding are energized. However after a predetermined time delay established by the pneumatic time-delay unit 25, the contacts 23 are bridged, short-circuiting the series-field winding.

It will be noted that the power switch 24 for the motor is operative for connecting the shunt winding directly across the two output terminals of the rectifying stage of the motor arrangement (not separately identified with a reference numeral).

Figure 2:
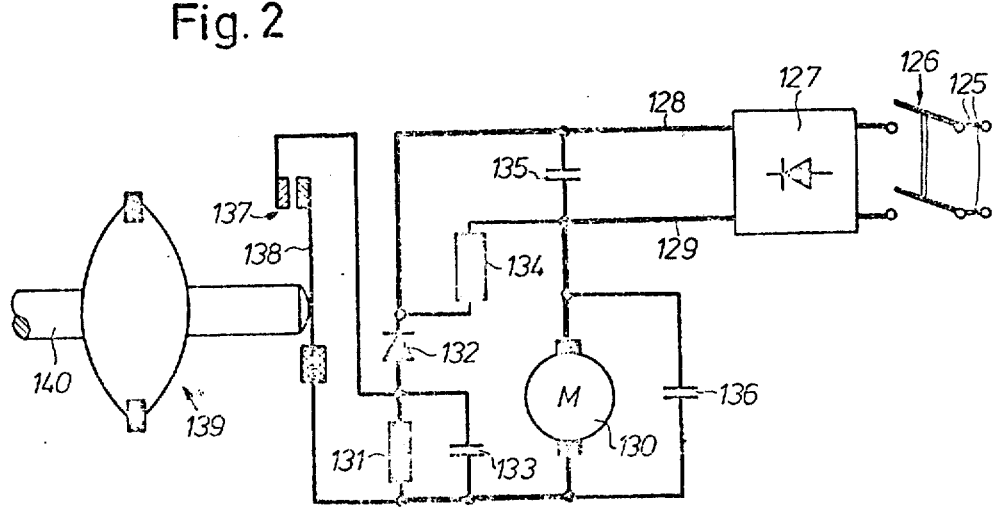
FIG. 2 illustrates a second embodiment according to the invention.
Figure 3:
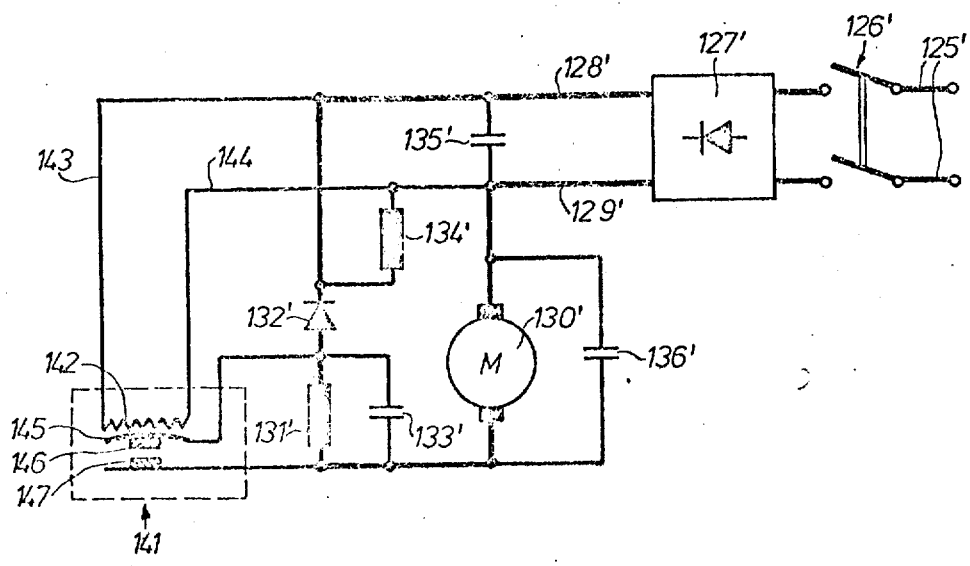

In the embodiment of FIG. 2, the motor of the arrangement has an armature winding generally designated with reference numeral 130 and shunted by a capacitor 136. The motor has a shunt-field winding 134 which is connected directly across the output terminals of the rectifying stage 127 via conductors 128 and 129. The shunt-field winding 134 is shunted by a capacitor 135. The motor furthermore has a series winding 131 shunted by a capacitor 133. It will be seen that one terminal of the series-field winding 131 is connected via a diode 132 to one terminal of the shunt-field winding. The anode and cathode of this diode 132 are so connected as to carry in forward diode direction current flowing through the armature winding 130. The rectifier stage 127 (which could conceivably comprise a single rectifying diode) has two input terminals for receiving A.C. power. A double-pole switch 126 connects the input terminals of the rectifier stage to the terminals 125 which are in turn connected to a source of A.C. power.

The arrangement shown in FIG. 2 is provided with a centrifugal switch arrangement generally designated by reference numeral 139. The centrifugal switch 139 comprises a rotatable shaft coupled in non-illustrated manner to the output shaft of the motor M and operative in a manner already known in the art for causing electrical engagement of the electrical contacts 137, 138 when the motor speed exceeds a predetermined value. These contacts 137, 138 are so connected to the series-field winding 131 as to short-circuit the same when the contacts 137, 138 become electrically engaged.

Figure 3:
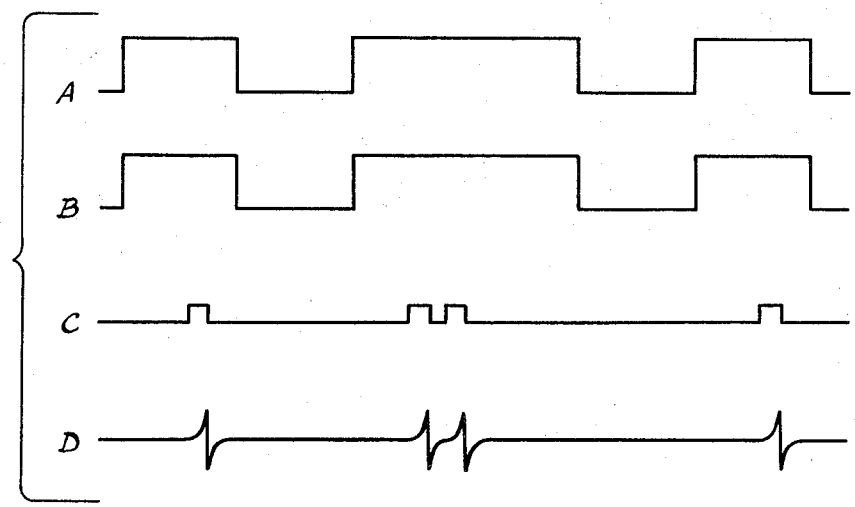
FIG. 3 illustrates a third embodiment according to the invention.
Figure 1:
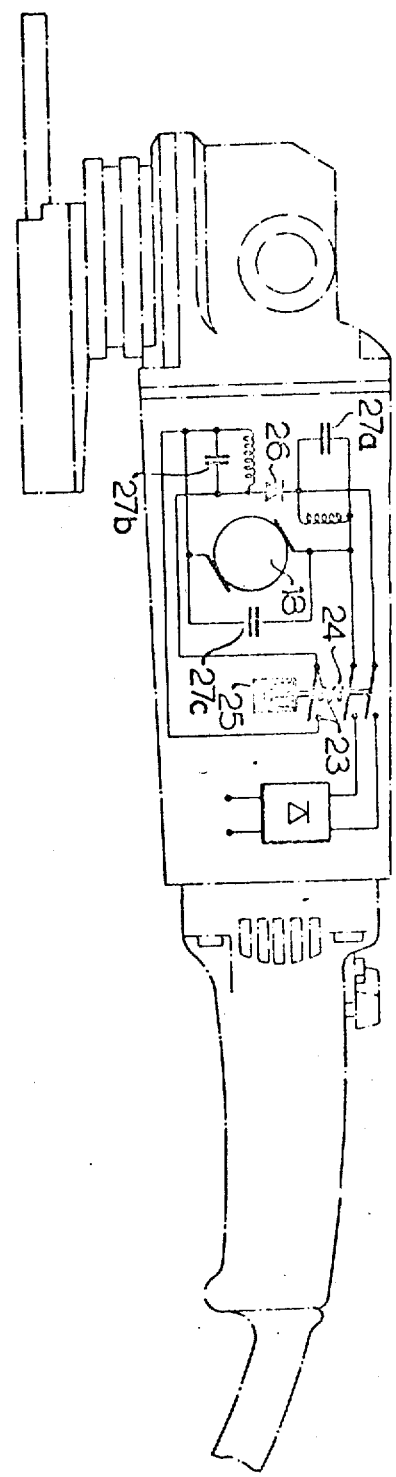

In the embodiment depicted in FIG. 3, the motor M is provided with an armature winding designated by reference numeral 130'. This armature winding is shunted by a capacitor 136'. The arrangement includes a rectifier stage 127' corresponding to rectifier stage 127 of FIG. 2. Likewise, circuit components 125', 126', 128', 129', 131'-135' also correspond to the similarly numbered components in FIG. 2. In this embodiment, short-circuiting of the series-field winding 131' occurs not in response to the action of a centrifugal switch, but rather after a temperature-dependent time delay. A temperature-sensing unit is generally designated by reference numeral 141 and includes two spaced electrical contacts 146, 147 so connected to series-field winding 131' as to short-circuit the latter when they become electrically engaged. The contact 146 is supported on a bimetallic strip, so that the spacing of the two contacts is a function of temperature. A heating coil 142 is positioned in proximity to the bimetallic strip 145 and is connected via lines 143 and 144 to the output terminals of the rectifier stage 147'. From the moment the motor is first energized, namely upon closing of switch 126', current will flow through the heating coil 142, heating the bimetallic strip 145. After a certain time delay, contacts 146, 147 will become electrically engaged and the series-field winding 131' will be short-circuited.

Figure 4:
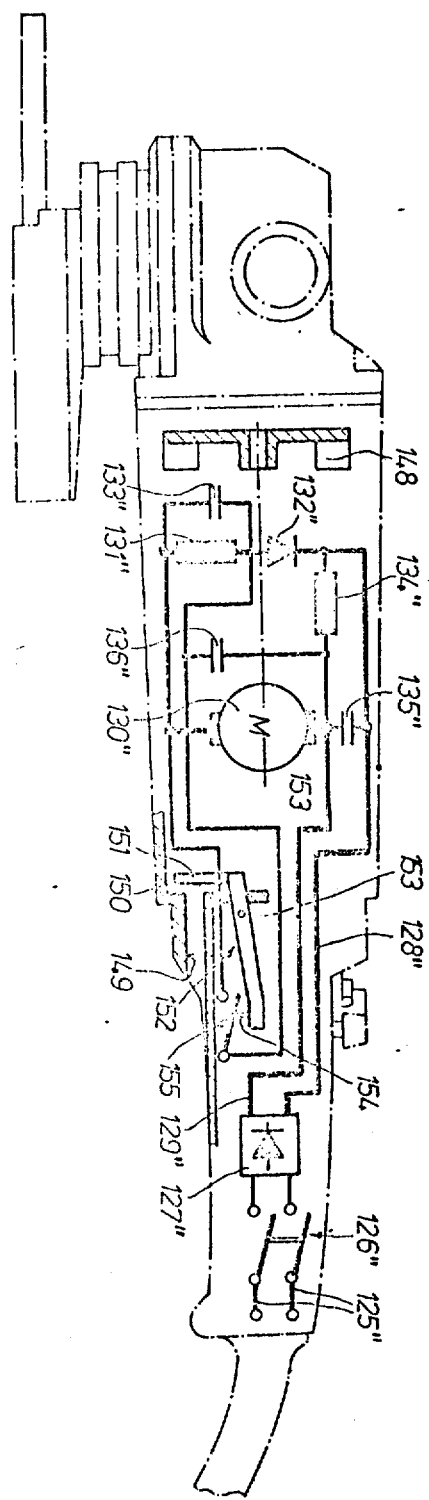
FIG. 4 illustrates a fourth embodiment according to the invention.

In the embodiment depicted in FIG. 4, those components corresponding to components already discussed with regard to FIGS. 2 and 3 are identified by corresponding reference numerals, followed by a double-prime. The only difference with respect to the previously discussed embodiments lies in the means for short-circuiting the series-field winding. The motor is provided with a cooling fan 148 which creates a flow of air whose strength corresponds roughly to motor speed. The housing 150 of the electric hand-held tool defines a ventilation opening 149 into which flows a stream of air established by the fan 148. Located in the path of this inflowing air is a small baffle plate 151 mounted on a lever 152 which is pivoted about a pin 153. Connected to the other end of lever 152 is a small intermediate member 154 operative for closing a switch 155 which short-circuits the series-field winding 131''. The fan 148 turns in such a direction as to cause an inflow of air into the motor housing through the ventilation opening 149. It will be readily appreciated that lever 152 tilts to an extent causing switch 155 to close when the motor speed has reached a value establishing a sufficient rate of air inflow into the ventilation opening 149.

Figure 5:
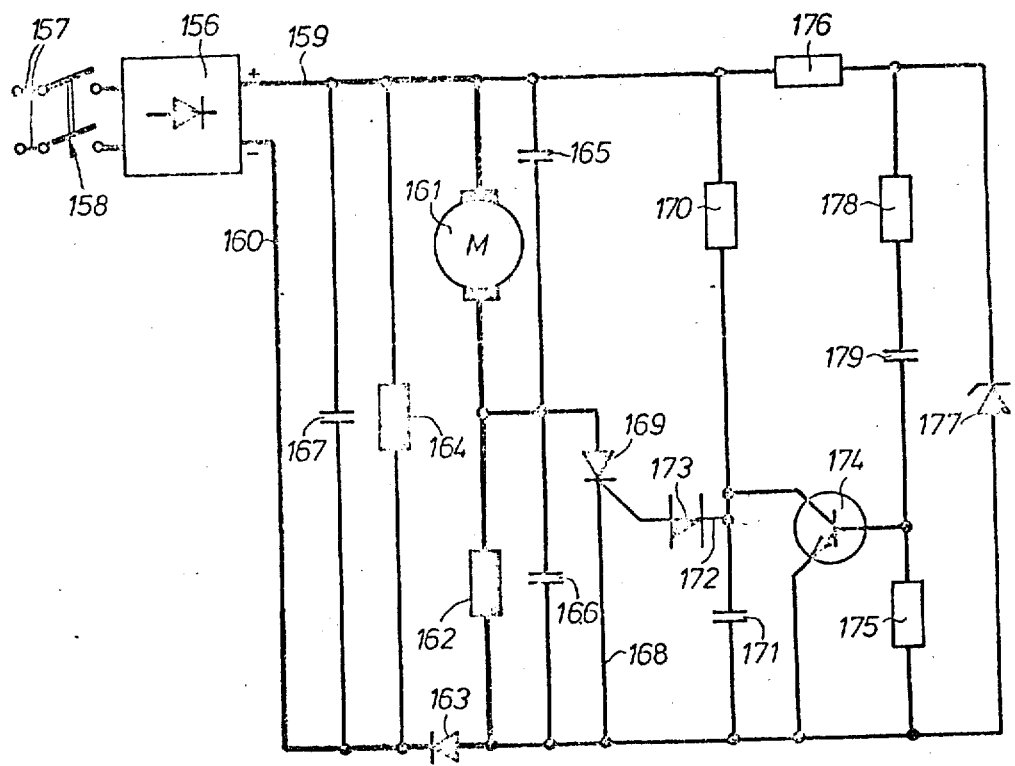
FIG. 5 illustrates a fifth embodiment according to the invention.

FIG. 5 is a wiring diagram of a purely electrical embodiment for shorting out the series-field winding of a compound motor of a power tool after motor start-up.

Two pole on-off switch 158 and leads 157 connect the recitifier 156, built into the power tool, to current. Leads 159 and 160 connect the motor armature 161, the series-field winding 162 and a diode 163 in series. A shunt-field winding 164 is connected in parallel with the armature, the series-field winding, and the diode 163. Capacitors 165 and 167 are connected in parallel respectively with the armature 161 and the shunt-field winding 164.

The series-field winding 162 is shunted by a thyristor 169 of which the cathode is connected by a lead 168 to the anode of the diode 163. The series connection of motor armature 161 and series-field winding 162 is shunted by a resistor 170 and a capacitor 171 connected in series. The voltage at the junction between the resistor 170 and the capacitor 171 is conducted by way of a control lead 172 and a four layer diode 173 to the control electrode of the thyristor.

The capacitor 171 is shunted by the emitter collector path of a transistor 174, the base emitter path of which is shunted by a resistor 175. The series connected resistor 176 and Zener diode 177 change the positive half waves of the pulsating direct current voltage from the rectifier 156 into a practically constant direct current voltage that is only very briefly interrupted. The voltage across the Zener diode 177 enables the capacitor 179 of the RC timing network 178, 179 to charge slowly and while charging to cause a voltage drop across the resistor 175. This voltage drop makes the transistor 174 conductive. Consequently, the capacitor 171 is short circuited and cannot charge to provide a triggering voltage for the thyristor 169.

After the passage of a predetermined interval of time, the capacitor 179 is charged, the voltage drop across the resistor 175 is zero, the transistor 174 is non-conductive, and the capacitor 171 is no longer short circuited. The capacitor 171 charges through the resistor 170 until the break-down voltage of the four layer diode 173 is reached. The thyristor 169 is triggered and short circuits the series-field winding 162. From this moment on the thyristor 169 is triggered for each half wave of the pulsating direct current voltage delivered by the rectifier 156, the series-field winding remaining short circuited and the drive motor operating as a shunt wound motor.

Figure 6:
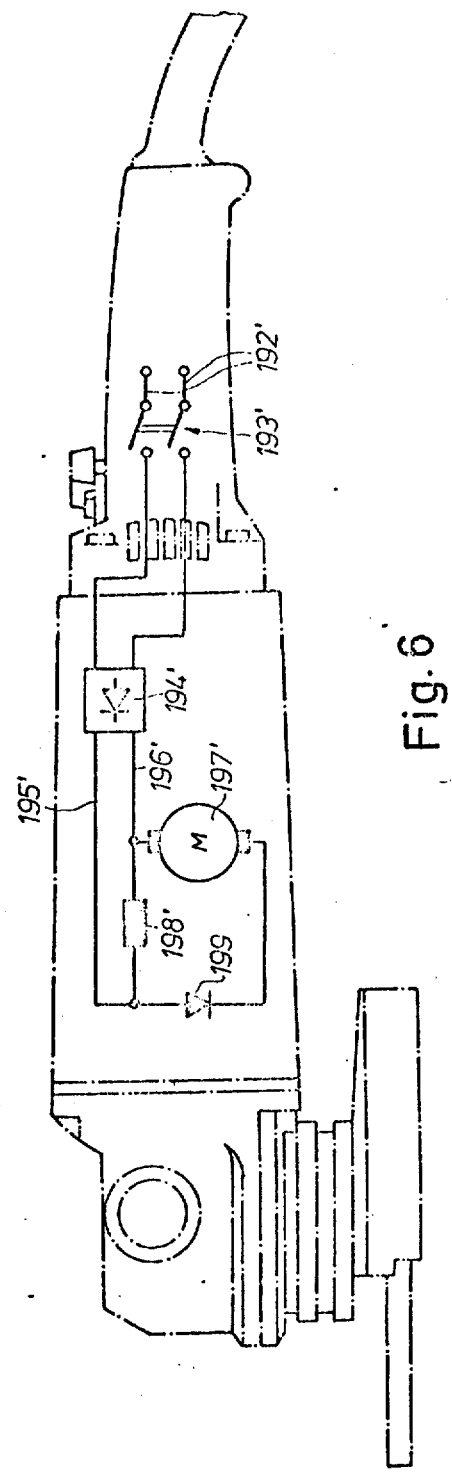
FIG. 6 illustrates a sixth embodiment according to the invention.

The embodiment of FIG. 6 is similar to those described before. A D.C. motor M is provided with an armature winding generally designated by reference numeral 197'. The motor has a shunt-field winding 198', and a diode 199 is connected between one terminal of the shunt-field winding 198' and one terminal of the armature winding 197'. The anode and cathode of this diode are so connected as to carry in forward diode direction the current flowing through the armature winding. The shunt-field-winding 198' is connected to the output terminals of rectifier stage 194' via leads 195', 196', and the rectifier stage input terminals are connectable via switch 193' to a pair of input terminals 192' for connection to a source of A.C. power. The provision of diode 199 causes the motor to operate with unusually small losses because the diode acts to suppress currents arising from the mutual induction between the armature and the field.

It will be understood that each of the elements described above, or two or more together, may also find a useful application in other types of constructions and circuits differing from the types described above.

While the invention has been illustrated and described as embodied in a D.C. motor arrangement, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended:

1. A motor arrangement, particularly for use in electric power tools, comprising, in combination, a D.C. motor including an armature winding having two terminals, rectifier means for converting A.C. voltage into D.C. voltage and having two output terminals, a shunt-field winding having two terminals and being connected across said output terminals and having one terminal connected to one terminal of said armature winding, a series-field winding having one terminal connected to the other terminal of said armature winding, a diode connected between the other terminal of said series-field winding and the other terminal of said shunt-field winding with its anode and cathode so connected as to carry in forward diode direction current flowing through said armature winding, and means for automatically short-circuiting at least part of said series-field winding after the start-up operation of the motor has proceeded to a predetermined extent.

2. An arrangement as defined in claim 1, wherein said means for short-circuiting comprises centrifugal switch means operative for short-circuiting said series-field winding when the speed of said motor exceeds a predetermined value.

3. An arrangement as defined in claim 1, and further including a capacitor shunting said series-field winding.

4. An arrangement as defined in claim 3, and further including a capacitor shunting said shunt-field winding.

5. An arrangement as defined in claim 1, wherein said means for short-circuiting comprises time-delay means operative for short-circuiting said series-field winding after a predetermined time delay subsequent to energization of the motor.

6. An arrangement as defined in claim 1, wherein said means for short-circuiting comprises temperature-dependent switch means connected in circuit with said motor and operative for short-circuiting said series-field winding after heating current has flowed through said temperature-dependent switch means and heated the latter up to a predetermined extent.

7. A motor arrangement, particularly for use in electric power tools, comprising, in combination, a D.C. motor including an armature winding having two terminals, rectifier means for converting A.C. voltage into D.C. voltage and having two output terminals, a shunt-field winding having two terminals connected across said two output terminals of said rectifier means, with one terminal of said shunt-field winding being connected to one terminal of said armature winding, and a diode connected between the other terminal of said shunt-field winding and the other terminal of said armature winding with its anode and cathode so connected as to carry in forward diode direction current flowing through said armature winding.

8. A motor arrangement, particularly for use in electric power tools, comprising, in combination, a D.C. motor including an armature winding having two terminals, rectifier means for converting an A.C. voltage into a D.C. voltage comprised of oscillating voltage harmonics and having two output terminals, a shunt-field winding having two terminals and being connected across said output terminals and having one terminal connected to one terminal of said armature winding, a series-field winding having one terminal connected to the other terminal of said armature winding, a diode connected between the other terminal of said series-field winding and the other terminal of said shunt-field winding with its anode and cathode so connected as to carry in forward diode direction current flowing through said armature winding and operative for suppressing currents arising from the mutual induction between the armature and the field, and means for automatically short-circuiting at least part of said series-field winding after the start-up operation of the motor has proceeded to a predetermined extent.

* * * * *

UNITED STATES PATENT OFFICE
CERTIFICATE OF CORRECTION

Patent No. 3,818,299　　　Dated June 18, 1974

Inventor(s) Kurt Paule et al.　　　Page 1 of 6

It is certified that error appears in the above-identified patent and that said Letters Patent are hereby corrected as shown below:

All drawings presently forming part of the issued patent are cancelled and the enclosed drawings are substituted herewith.

Signed and Sealed this seventeenth Day of February 1976

[SEAL]

Attest:

RUTH C. MASON
Attesting Officer

C. MARSHALL DANN
Commissioner of Patents and Trademarks